United States Patent [19]

O'Connor

[11] 4,366,063
[45] Dec. 28, 1982

[54] PROCESS AND APPARATUS FOR RECOVERING USABLE WATER AND OTHER MATERIALS FROM OIL FIELD MUD/WASTE PITS

[75] Inventor: Rodney J. O'Connor, College Station, Tex.

[73] Assignee: Romec Environmental Research & Development, Inc., College Station, Tex.

[21] Appl. No.: 274,654

[22] Filed: Jun. 17, 1981

[51] Int. Cl.³ .............................................. C02F 1/44
[52] U.S. Cl. ................................... 210/652; 210/747; 210/806; 210/170; 210/241; 210/259; 210/321.1; 166/267; 175/66
[58] Field of Search ............... 210/652, 653, 654, 655, 210/693, 747, 806, 170, 638, 241, 242.4, 242.2, 242.3, 259, 321.1, 242.1, 433.2; 166/265, 266, 267; 175/66

[56] References Cited

U.S. PATENT DOCUMENTS

| | | | |
|---|---|---|---|
| 2,596,151 | 5/1952 | Hudson | 210/241 |
| 2,674,440 | 4/1954 | Donovan | 175/66 |
| 2,886,287 | 6/1959 | Croley | 255/1 |
| 2,919,898 | 1/1960 | Marwil et al. | 255/1.8 |
| 3,574,329 | 4/1971 | Beavon | 210/80 |
| 3,639,231 | 2/1972 | Bresler | 210/259 |
| 3,693,733 | 9/1972 | Teague | 175/66 |
| 3,764,008 | 10/1973 | Darley et al. | 210/73 |
| 3,776,842 | 12/1973 | Grimme | 210/259 |
| 3,777,405 | 12/1973 | Crawford | 175/66 |
| 3,821,108 | 6/1974 | Manjikian | 210/23 |
| 3,823,086 | 7/1974 | Schmidt | 210/259 |
| 3,844,944 | 10/1974 | Mercuri | 210/242.3 |
| 4,153,553 | 5/1979 | Davis | 210/241 |
| 4,161,445 | 6/1979 | Coillet | 210/23 |
| 4,176,057 | 11/1979 | Wheatley | 210/259 |
| 4,234,421 | 11/1980 | Dover | 175/66 |
| 4,276,177 | 6/1981 | Smith | 210/259 |

FOREIGN PATENT DOCUMENTS 52-28060  3/1977  Japan ................................. 210/241

OTHER PUBLICATIONS

Gouveia Chemical Engineering Progress Symposium Series, Potable Water from Hospital Wastes by Reverse Osmosis, vol. 64, No. 90, 1968, pp. 280-284.

Primary Examiner—Ernest G. Therkorn
Attorney, Agent, or Firm—Pravel, Gambrell, Hewitt, Kirk & Kimball

[57] ABSTRACT

This invention discloses a process and apparatus for removing usable water and other components from drilling mud/waste mixtures containing water, solids, hydrocarbons and dissolved salt. Solids are separated from waste water resulting in recovery of a water stream containing hydrocarbons and dissolved salts. This stream is then separated into a recoverable hydrocarbon stream and a water stream containing dissolved salts. A reverse osmosis means is then utilized for separating the water stream containing dissolved salts into a permeate stream of environmentally safe water for reuse and a concentrated brine stream.

4 Claims, 2 Drawing Figures

PROCESS AND APPARATUS FOR RECOVERING USABLE WATER AND OTHER MATERIALS FROM OIL FIELD MUD/WASTE PITS

BACKGROUND OF THE INVENTION

This invention relates to a process for recovering useful water and other materials from a water containing mixture found in oil field mud and waste pits typically containing solids, hydrocarbons and aqueous chemical impurities and the apparatus for practicing the process. During the drilling of oil wells and the production of oil from subterranean formations, large quantities of water are used which become contaminated with the components of drilling mud, tailings removed from the hole during drilling operations, hydrocarbons from the producing formation, and large quantities of salts, both naturally occurring and added to drilling fluids during drilling operations. As the search for oil goes deeper and more remote from sources of water, the value of useful water increases, particularly in situations where it is necessary to move water by truck to well sites to provide water needed for drilling operations.

Further, the proper disposal of oil well drilling fluids deposited in waste pits presents serious environmental and ecological problems. The practice of dumping water from oil well operations containing both brine, solids, in the form of sand and minerals, and hydrocarbons, into unlined earthen pits on the surface dates back to the early 1920's. Heretofore, such waste fluids have typically been allowed to accumulate in open pits with the water being allowed to evaporate and the residual salts and solids simply retained in the pit. However, this practice has been found to constitute a major source of pollution to underground fresh water tables through the leaching of contaminates through the earth into the water table. Each rainfall that occurs causes the deposited salts and other soluble chemicals to leach from the pits and ultimately to be carried into the underground water table. Salt contamination, principally sodium and potassium chlorides, may render the water in such tables unfit for human and animal consumption or as irrigation water for agricultural use.

Present methods for treating oil field waste pits do not allow for recovery of usable water or of dissolved and dispersed oil. Ecologically safe disposal has necessitated either the hauling of the waste to safe disposal sites or the expensive rendering of the waste to becoming environmentally safe. With rapid increase in oil drilling operations, waste pits become an ever increasing economic and environmental problem. To avoid costly cleanup operations, some pits are cut to dump contaminates into surrounding areas and others are allowed to stand until evaporation of water permits them to be buried. This still does not solve the problem of leaching caused by rainfall.

Several methods have been disclosed relating to the treatment of mud/waste pits but all fall short of a method for economically producing reusable and, in many cases, even potable water. A method described in U.S. Pat. No. 3,764,008 for example, describes the separation of oil well production fluids which include water, liquid hydrocarbons and oily sand through the use of additional water for cleaning oil from the sand and separating sand from the liquid and then floating the oil from the water. This neither takes care of salts dissolved in the water nor of dispersed hydrocarbons. Another method for separating oil, particulate solids and water is described in U.S. Pat. No. 3,574,329. The treatment of well drilling mud is described in U.S. Pat. Nos. 2,886,287 and 2,919,898 for recovering usable drilling mud and recycling it through the system but not for recovering water itself from such systems. Desalinization of water through the use of a reverse osmosis system is well known and described in U.S. Pat. Nos. 3,821,108 and 4,161,445 for example. These patents teach the recovery of relatively useful water to begin with and do not relate to the recovery of usable or even potable water from a mud/waste pit. One system described in an *Oil and Gas Journal* article (Dec. 1, 1980 at pages 138 and 139) involves chemical treatment and, in extreme situations, clarifiers and centrifuges to recover usable water from pits which are not salt contaminated. Most mud/waste pits are contaminated with salt. Other than for this last reference, and it falls far short as set forth above, none of the references mentioned above even attempt to solve the problem solved by the invention described herein.

The practice of the present invention provides a relatively inexpensive method for cleaning oil field mud/waste pits or production fluids such that the search for hydrocarbon reserves and the production thereof is accomplished in an economical and environmentally beneficial way.

Although the primary focus of this invention is to the recovery of usable water from oil field mud/waste pits, numerous other applications will be apparent to those skilled in the art from the disclosure which follows.

SUMMARY OF THE INVENTION

This invention pertains to a method for recovering useful and even potable water from an aqueous mixture containing solids, hydrocarbons and salts particularly those found in oil field mud/waste pits, and the apparatus for practicing such a process. The process of this invention involves first separating solids from the water mixture by filtering solids from the mixture to recover a water stream containing hydrocarbons and salt impurities. This filtration can occur through the use of a filter means through which the water mixture is pumped or by drawing the water stream through an immersible filter placed in the container holding the water mixture. The container can be either a tank of some kind or the mud/waste pit itself. The next step involves separating the hydrocarbons from the water stream using an oil/water separation means and recovering a separated hydrocarbon stream and a water stream containing salt impurities, usually sodium and/or potassium chlorides. The water stream then would be passed to a filtering and adsorption means where any remaining particulates and residual hydrocarbons are removed to produce a water stream substantially free of solids and hydrocarbons which is then introduced under pressure into a reverse osmosis unit for recovery of a useful water stream and a concentrated brine stream of substantially less volume for disposal. This brine stream is also useful for other purposes.

One preferred embodiment of this invention is to have the means for practicing the process of this invention mounted on a mobile trailer for movement to on-site treatment locations for operation, thus substantially reducing the costs of transporting water to, or waste from, the location. The water can be transferred for use at an adjacent well site through a tank truck or temporary water line, thus avoiding long trucking distances for water needed in drilling or production operations.

The process of this invention can be used for waste water mixtures of widely varying compositions which are likely to occur during drilling operations. The mixture may be analyzed to determine a suitable chemical pretreatment to improve the operation of the process of this invention. Oil field mud/waste pits, for example, may contain a film or separate upper phase consisting of organic materials, principally oil components; an aqueous phase containing dissolved and suspended materials including acids, dispersants, viscosifiers, emulsifiers and various oil fractions and minerals; and a sedimentary phase containing solids of varying density and particle size along with entrapped fluids. The compositions and amounts of the various mixture of components can be determined and suitable chemicals can be added to attain the pH range for optimum oil and water separation and to precipitate some components which are insoluble in water. The preferred pH would vary from about 5 to about 9.

BRIEF DESCRIPTION OF THE DRAWINGS

Details of the embodiments of this invention are more readily understood by reference to the annexed drawings in which.

DETAILED DESCRIPTION OF THE INVENTION

The method of the present invention is performed by either pumping the waste mixture through a separation means, or preferably by pulling the water mixture through an appropriate immersible filter or centrifugal separator from the container for the mixture, such as a storage tank or mud/waste pit, to separate the solids from the hydrocarbons and aqueous salt mixture. The hydrocarbons and aqueous salt mixture is then transported through the appropriate pump into an oil-water separator where the oil and water are separated. The oil is removed from the separator and collected in an appropriate storage container or a truck for transportation for storage or disposal. The resulting water stream containing salts and possibly small amounts of solids and hydrocarbons is then conducted through a suitable pipe to a filter and adsorption unit where the residual solids and oil are removed from the water stream resulting in a water stream being substantially free of solids and hydrocarbon but containing the salt impurities, usually mostly in the form of sodium and/or potassium chlorides. From this filtration-adsorption unit, the water stream is pumped to a reverse osmosis unit under pressure where the permeate stream passing through the reverse osmosis membrane(s) is (are) recovered for further use. A concentrated brine stream remaining comprises about 25% of the volume of the original mixture removed from the waste pit and may be more economically transported for disposal or reused in oil production operations. It is also of such quality that it may, if state regulations permit, be pumped into a subsurface disposal well.

The collection devices used to store the water, brine or oil recovered through the practice of this invention may either be tanks on site, transport vehicles or reusable, flexible tanks carried to and from the well sites or the sites where water mixtures to be treated are located on trucks and then emptied and reused as appropriate.

Figure 1:
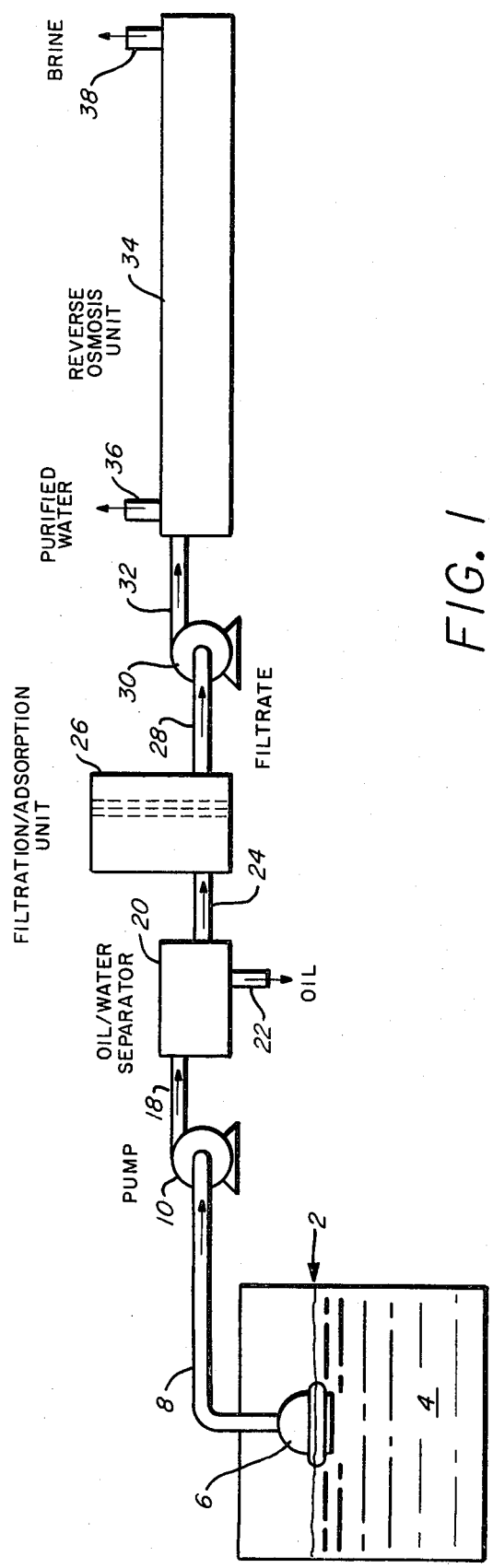
FIG. 1 is a schematic block diagram showing the components of this invention in sequence.

Turning now to the drawings to more specifically describe the instant invention, FIG. 1 is a schematic diagram showing elements useful in the practice of this invention arranged in sequence of operation. It shows a container 2 holding an oil and water mixture to be treated for recovery of useful water and other components. This container 2 may be either a tank or an earthen mud/waste pit shown in FIG. 2. The mixture containing solids, hydrocarbons and dissolved salts and possibly other chemicals is removed from the container 2 preferably through an immersible filter 6 through a line 8 and thence to a pump 10, which can either be a diesel powered pump or an electric pump powered by either on-site electricity or electricity generated on the site. The filter 6 separates the liquids from the solids which liquids are carried through line 8 to the pump 10. Turning to FIG. 3 for a moment, the filter 6 is shown having a floatation collar 12 which determines the depth at which the filter 6 is submerged into the water mixture 4. As to preferred details of the filter, it may properly have a screen 14 to cause initial separation and to retain packing elements 16 in the filter 6 which determines the degree of filtration accomplished by the filter 6. Such packing elements 16 which accomplish the initial filtration may be of graduated coarseness to accomplish proper filtration without plugging and may include such things as sand, gravel, wire mesh and the like. A number of such filter units are commercially available such as the Hayward Duplex Strainer sold by Marshall J. Brown, Inc. in Stafford, Tex.

Returning now to FIG. 1, the water mixture separated from the solids leaves the pump 10 through line 18 and enters an oil and water separator means 20. This oil and water separator 20 may be a means well known to those skilled in the art such as, for example, an OIL SEP oil-water solids separator sold by BINAB U.S.A., Inc. in Miami Lakes, Fla. and commercially available on the market. The oil and water separator means 20 produces an oil stream which is removed through pipe 22 and thence to suitable storage or transportation for disposal, not shown, and a water stream possibly containing small amounts of hydrocarbons and possibly some solids, either in the form of colloidal or suspended particles, but yet contaminated by the salts in the original water mixture removed from the container 2. This water stream is removed from the oil and water separator 20 through line 24 and thence to a filtration/adsorption means 26.

The filtration/adsorption means 26 may suitable contain a filter of appropriate size to remove any remaining solids, an adsorbant, such as, for example, charcoal or a granular anthracite filter, to remove any small amounts of hydrocarbon which may remain in the water stream after passing through the oil and water separator means 20 and an ion exchange means to reduce concentration of multivalent ions. With respect to the practice of this invention, the filtration/adsorption means 26 could be duplicate units in parallel such that one such unit could be backwashed and cleaned while the other unit is in operation on stream. Thus, line 24 bringing the water stream into the filtration/adsorption means 26 could have appropriate valves to allow the switching from one unit to the other. Such valves as well as the backwash system are not shown on the drawing but are well known to those of ordinary skill in the art. As a particular advantage to the practice of this invention, the purified water recovered in the reverse osmosis means can be used for the backwash and reintroduced into the container 2 for the waste water mixture 4 such that no water is wasted from recovery. Also, output brine recovered can be used to regenerate the ion exchange means.

The filtration/adsorption means 26 would be fitted with proper pressure and level detecting means on both sides of the filter and adsorbent such that the flow through the unit can be monitored to maintain a steady state flow and to determine when backwashing is necessary. Such details are not shown on the drawings since such items are well known in the art.

The water stream recovered from the filtration/adsorption means 26 is substantially free of hydrocarbon and any solids and passes from the filtration/adsorption means 26 through line 28 to a pump 30 which boosts the pressure of the water stream containing salts to the operating pressures of a reverse osmosis means. The operating pressure differentials for such reverse osmosis apparatus is usually in the range of from about 500 psi to about 1500 psi, with the capability to withstand an input pressure of at least about 2000 psi with operating temperatures being ambient conditions in the range of from about 15° C. to about 45° C.

The pump 30 moves the water through line 32 to the reverse osmosis means 34 which, like the filtration/adsorption means 26, is employed with appropriate valving, not shown, to allow periodic backwash of the reverse osmosis unit 34. The operating pressure for such reverse osmosis means 34 varies according to the design and characteristics of such unit.

The reverse osmosis unit 34 operates using semipermeable membrane elements, many of which are suitable for use in the practice of the invention. They may be suitably selected by those skilled in the art. One useful embodiment is known as a De-Sal 1 unit manufactured by Desalinization Systems of Escondido, Calif. Since the reverse osmosis means 34 also requires backwashing, appropriate valving and piping is used, also not shown since it is well known to those skilled in the art, to backwash the membranes of the reverse osmosis unit. The backwash from such reverse osmosis unit can either be returned to the system or purged from the system with the brine recovered from the reverse osmosis unit 34 for disposal. Even if this latter alternative is used, the volume still remains very small compared to the original volume of the waste mixture treated.

The incoming water stream from pipe 32 is introduced into a reverse osmosis membrane zone of the reverse osmosis unit 34 where it is separated into a permeate stream which contains usable and often times potable water which exits the reverse osmosis means 34 through line 36 to an appropriate storage facility or a mobile tank truck, not shown. The remaining brine is withdrawn from reverse osmosis means 34 through line 38 for storage, use, sale or disposal.

It is understood that in the use of a reverse osmosis means 34 that a single or multiple stage unit may be employed. A multiple stage unit is preferred when it is desired to recover potable water from the system whereas in instances where usable water is desired for use in makeup of drilling mud and the like it may not be necessary to achieve the purity necessary for potability. Operation of the apparatus in the process of this invention is sufficiently flexible to allow for such variances of operation.

The practice of this invention allows up to about 75% of the water present in the original mixture to be recovered in a quality meeting environmental requirements and other use requirements effecting a considerable savings. Where the salt content of the mud/waste pit is low even higher recovery is possible.

In the practice of this invention it may be desired or even necessary to pretreat the waste water with chemicals such as lime and the like to adjust the pH of the waste water or waste mud to facilitate oil and water separation, to aid in breaking emulsions which may be present and to precipitate as solids certain salts in the waste water. Those of ordinary skill in the art knowledgeable in dealing with chemical treatment of water will readily recognize these requirements which are not a part of this invention but can be employed to enhance and improve the operation of the process of the invention.

Figure 2:
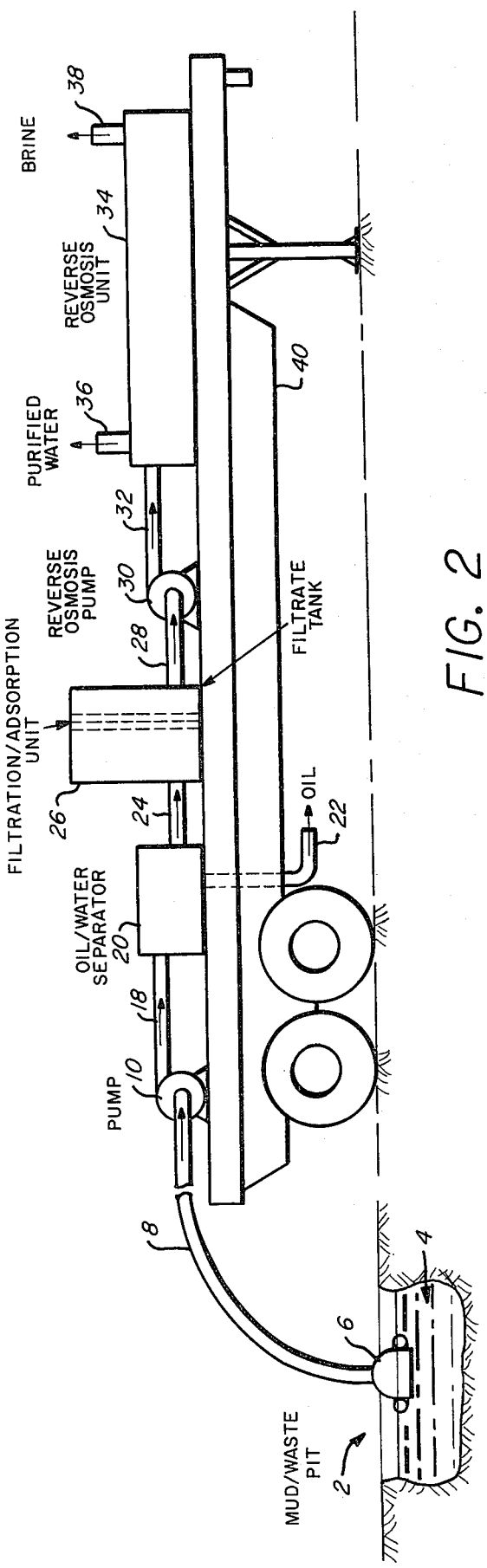
FIG. 2 is a schematic diagram showing the preferred embodiment of this invention with the separate means employed in the practice of the process of this invention mounted on a mobile trailer with detail of controls and valves and the like, well known to those skilled in the art, being omitted.
Figure 3:
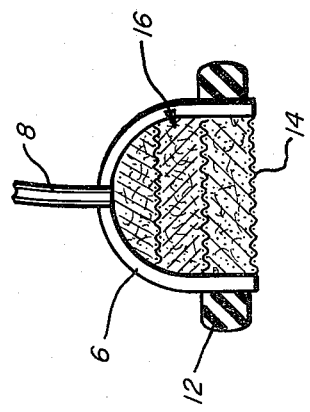
FIG. 3 shows the detail of a preferred embodiment of the initial filter used in the practice of the process of this invention for separating solids from the waste water to be purified.

The embodiment of this invention shown in FIG. 2 can be considered as described above with the same numbers being used as previously used in connection with the discussion of FIG. 1 but that the means for accomplishing the process of this invention are mounted on a trailer 40 for mobile use on the site, thus providing an additional advantage to the practice of this invention. A further advantage to this invention is that the components can be sized for various volumes of throughput depending upon the needs of the individual users.

As can be seen from the foregoing description, what had been a hitherto messy mixture of water, hydrocarbons, tailings from drilling operations, components of drilling mud systems, salts from conate water in the formation and fracturing acids and the like are separated into either streams which are disposable in an environmentally safe and easy manner or usable in other operations, for example, as in the case of the water obtained by the practice of this invention. The economic impact of the practice of this invention is apparent. It avoids the transportation of large volumes of water into arid areas for drilling and production operations. It also materially reduces the quantities of troublesome wastes which must be transported for disposal and provides purified water for use not only in subsequent oil drilling and production operations but for agricultural and drinking purposes as well. Useful oil and brine, and possibly even useful drilling mud, are recoverable.

The foregoing description of this invention is made for purposes of illustration and enablement for those skilled in the art to practice the same. Many variations of this invention will become apparent because of the foregoing description but such variations do not depart from the scope and intent of the appended claims. As to any of the specific means described to perform specific functions in the practice of the described invention, other components which are equivalent in function may be substituted for those specifically described without departing from the scope of this invention.

I claim:

1. A mobile apparatus for recovering useful water from mud/waste pits resulting from drilling operations which contains a mixture of water, solids, hydrocarbons and dissolved salts which consists essentially of;
   a truck bed suitable for carrying apparatus from one location to another when connected to a prime mover;
   an immersible filter through which the water, hydrocarbons and dissolved salts are pulled to separate them from solids in the waste pit;
   conduit and a pump for transferring the water, hydrocarbons and dissolved salts to an oil and water separator means;
   an oil and water separator means for forming an oil stream for removal and discharge and a water stream for subsequent processing;
   a filtration and adsorption means communicating with the oil and water separator means to remove residual hydrocarbons and solid particulates which may remain in the water stream to leave a water stream containing dissolved salts;
   a pump means communicating with the filtration and adsorption means through the inlet of the pump, and a reverse osmosis means through the outlet of the pump to provide operating pressure for the reverse osmosis means; and
   a reverse osmosis means for separating the waste stream into a useful water stream substantially free of contaminants as a permeate and a brine stream wherein the elements of the mobile apparatus are carried by the truck bed.

2. A process for recovering reusable water and other components from a source of a mixture containing water, solids, hydrocarbons and dissolved salt impurities which consists essentially of the steps of:
   (a) filtering solids from the mixture in a holding container for the waste mixture and recovering a water stream containing hydrocarbons and dissolved salt impurities; then
   (b) separating the hydrocarbons from the water stream and recovering the separated hydrocarbons and a water stream containing dissolved salt impurities; then
   (c) passing the resulting water stream from step (b) under pressure to a reverse osmosis membrane zone; and then
   (d) recovering a permeate stream comprising usable water and a concentrated brine stream.

3. The process of claim 2 which includes the step of;
   passing the water stream of step (b) through filtration and adsorption means to remove any residual solids or hydrocarbons from the water stream.

4. A process for recovering potable water from a drilling mud/waste pit containing a mixture of water, hydrocarbons, solids and dissolved salts which consists essentially of the steps of;
   (a) filtering the water, hydrocarbons and dissolved salts from the mud/waste pit by pulling them through, under pump suction, an immersible filter set in the mud/waste pit; then
   (b) separating the hydrocarbons from the mixture passing through the filter to form a hydrocarbon stream and a water stream containing dissolved salts; then
   (c) filtering the water stream and passing the water stream through an adsorbent bed to remove residual solids and/or hydrocarbons in the water stream; and then
   (d) pumping the water stream containing dissolved salts at a pressure of up to about 2000 psi into a reverse osmosis zone wherein a permeate of potable water and a brine stream are recovered.

* * * * *